G. DOD.
DOLL HEAD OR BEARING FOR DRYING CYLINDERS.
APPLICATION FILED NOV. 15, 1921.

1,425,635.

Patented Aug. 15, 1922.
9 SHEETS—SHEET 2.

Inventor:
Gerald Dod.
By his Attorney: Walter Gunn

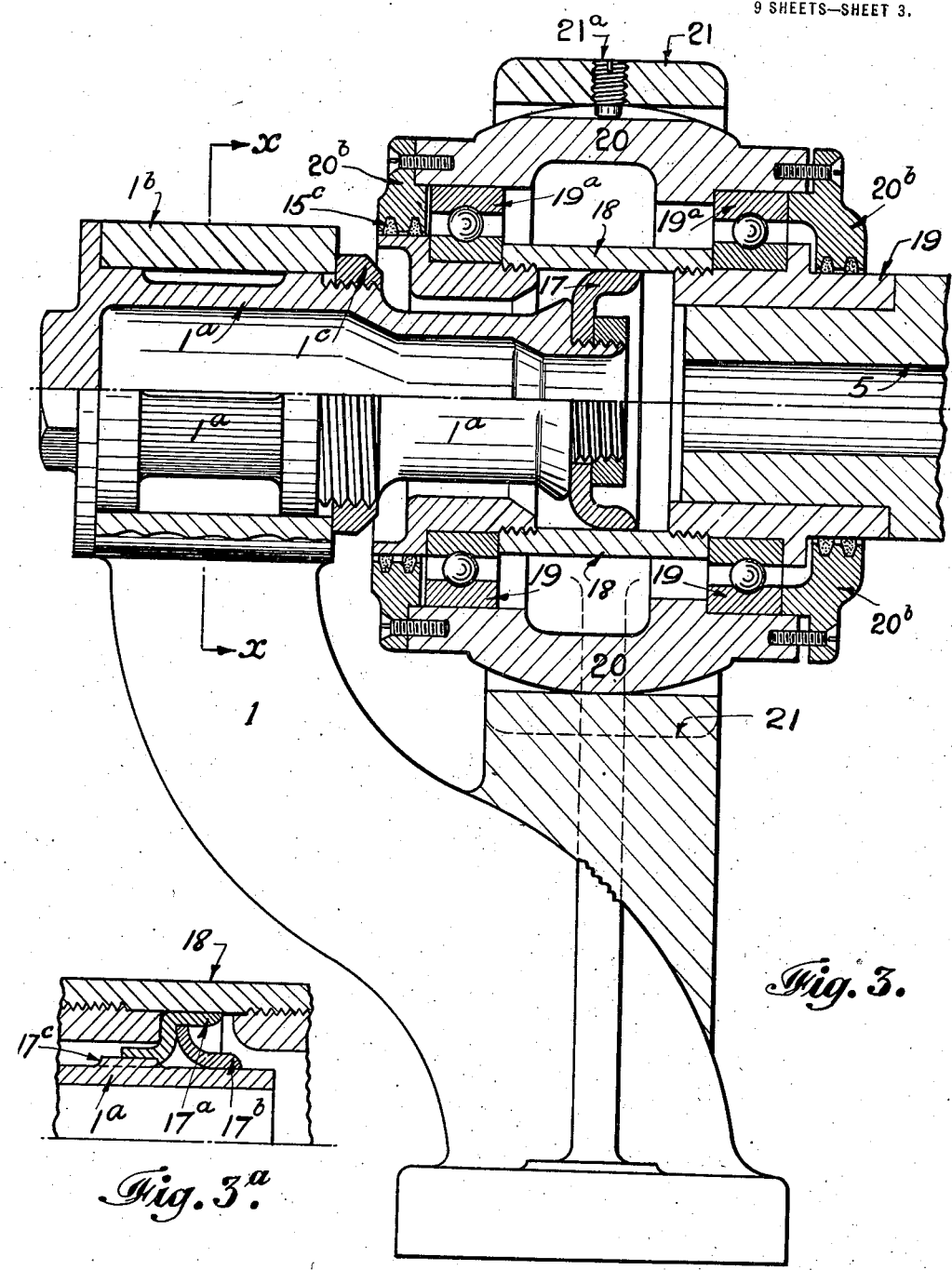

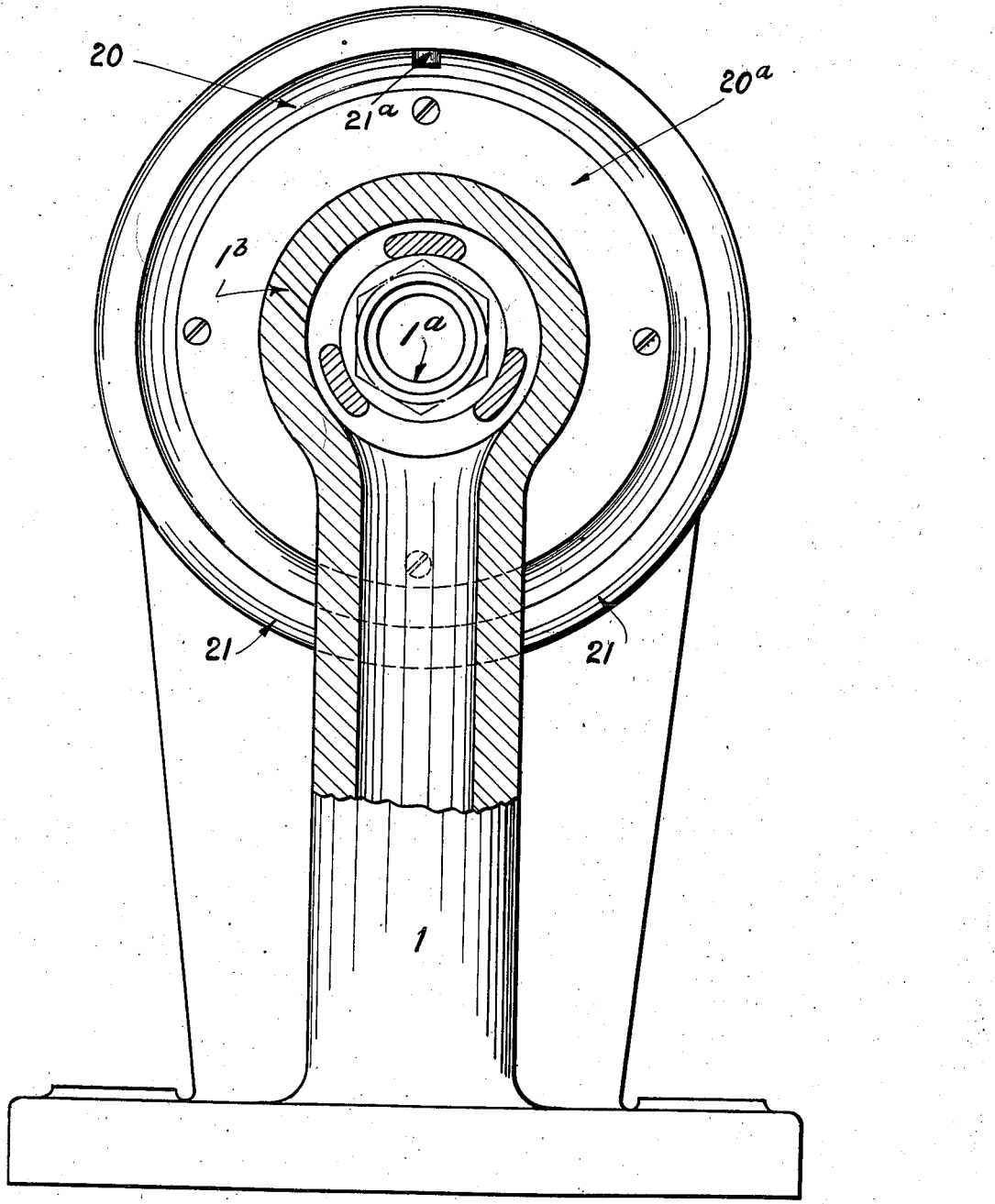

Fig. 5.ª

Inventor:-
Gerald Dod.
By his Attorney:- Walter Gunn

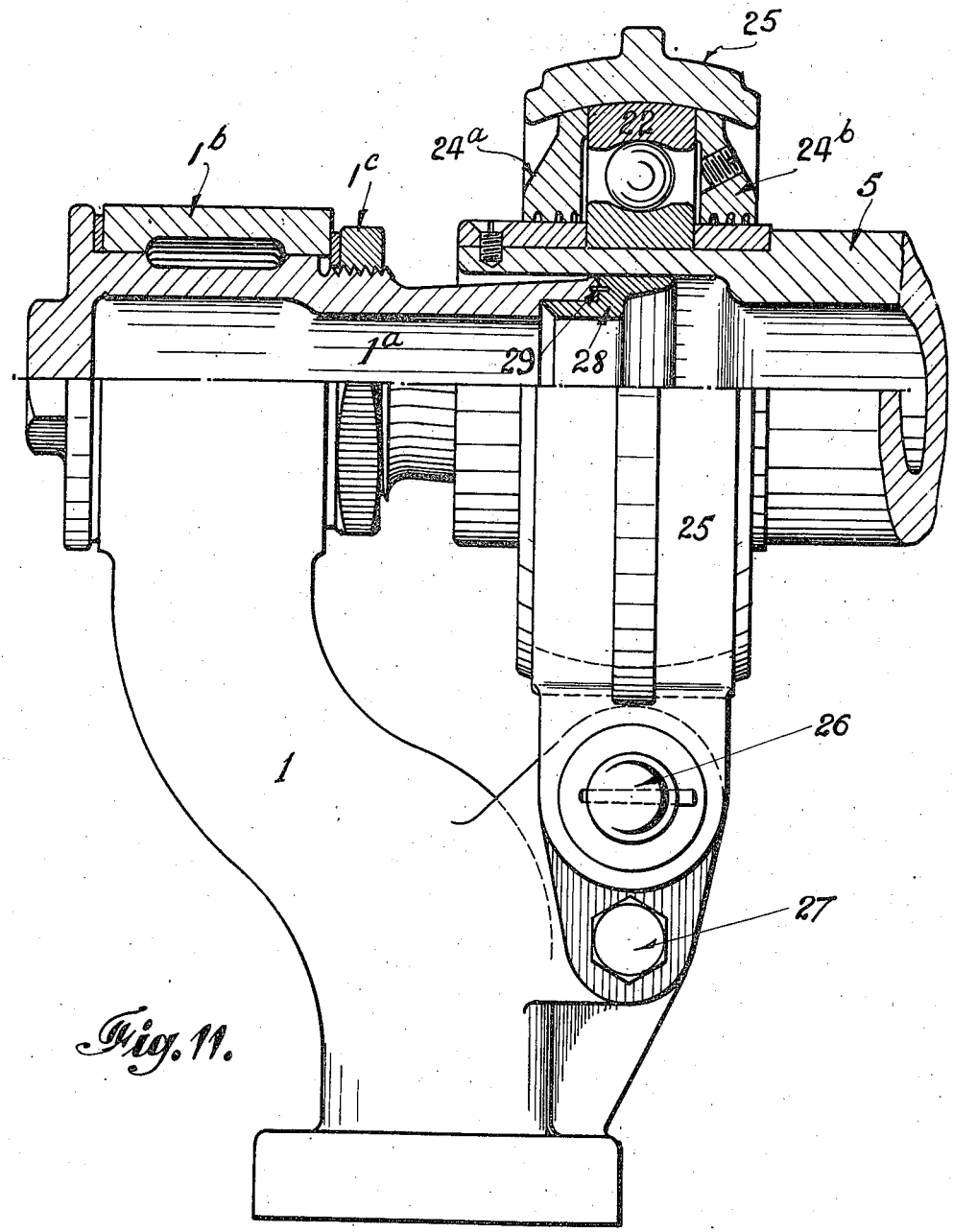

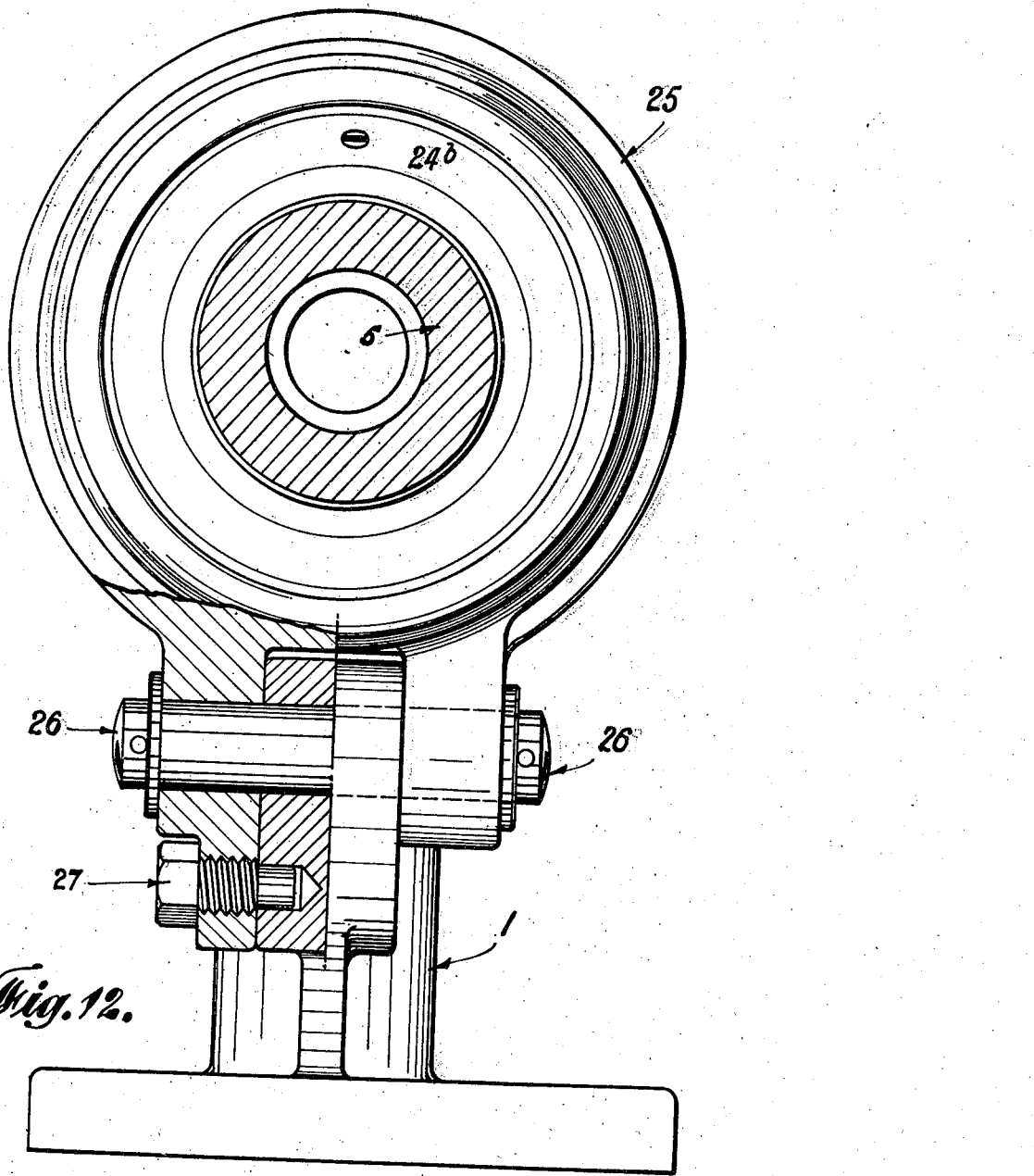

UNITED STATES PATENT OFFICE.

GERALD DOD, OF SOUTHPORT, ENGLAND.

DOLL HEAD OR BEARING FOR DRYING CYLINDERS.

1,425,635. Specification of Letters Patent. Patented Aug. 15, 1922.

Application filed November 15, 1921. Serial No. 515,372.

*To all whom it may concern:*

Be it known that I, GERALD DOD, a subject of the King of Great Britain and Ireland, residing at Southport, Lancashire, England, have invented new and useful Improvements in or Relating to the Doll Heads or Bearings for Drying Cylinders, of which the following is a specification.

This invention refers to the doll heads, or bearings of drying cylinders for drying fabrics, paper and the like. Usually the doll heads serve to axially support the hollow trunnions of each cylinder and also to convey steam and water of condensation or hot air to and from the cylinder via the trunnions, and in order to afford a fluid-tight joint between the doll heads and the trunnions it is customary to use packing between the doll heads and trunnions capable of being tightened up by a gland. Provided the doll heads and cylinder trunnions are truly aligned the joints are easily maintained in good order, but should the doll heads be out of line, the said joints are difficult to maintain and leakage of the joints takes place.

Examples of want of alignment may be (1) the doll head for one end of the cylinder is parallel with but out of line with the doll head for the other end of the cylinder; (2) the doll heads are not parallel with each other in any plane; (3) the trunnions on either side of the cylinder are (a) parallel with each other but out of line or (b) not parallel with each other in any plane.

With the first example, the want of alignment can be met by arranging the doll heads to take up a true line position and fixing them in such position, but in the second and third examples, the mere adjustment of the doll heads will not overcome the difficulty, since the trunnions of the cylinder, whilst rotating about their own longitudinal axis, or that of the doll heads, such longitudinal axis tends to rotate about a further axis corresponding to the main axis of the cylinder.

The errors in alignment may be due to errors in manufacture or erection of the doll heads, or in the manufacture or erection of the machine frames, and (or) in the turning or fitting of the cylinder trunnions.

The cause of the joints leaking is usually attributed to want of efficiency of the packing, and various arrangements have been proposed for dispensing with the packing and substituting other jointing means but the primary cause of the joints leaking is usually not want of efficiency of the packing but the mal-alignment of the doll heads or bearings, or cylinder trunnions as aforesaid.

The effect of the trunnions or doll heads being out of line and out of parallel, is to cause the opening in the bearing parts of the doll heads and packing to become enlarged, and thus break the joints as well as damage the bearings.

One of the objects of this invention is to provide a form of bearing for drying cylinders, which is self-aligning, i. e.: in which any want of alignment in the doll heads or trunnions at the opposite ends of a cylinder has no ill effect on the bearings, or on the joints, the one bearing being suitable for any of the errors of alignment 1, 2 or 3 aforesaid.

In using packing material to maintain the joints between the doll heads and trunnions the packing is usually tightened up to an extent which puts considerable friction on the trunnions and thus adds to the resistance to rotation of the cylinder.

A further object of this invention is an arrangement of surface or packed joint which is not affected by want of alignment of the bearings or cylinder trunnions, and does not therefore require to be tightly packed.

In known arrangements previously proposed for dispensing with the packing, the cylinder trunnions have been mounted in bearings separate from the means for maintaining the fluid joints, these latter being in the nature of spherical faced parts, held together by springs, any elongation and contraction of the cylinder being allowed for by relative movement between the spherical faced parts. Such parts however, whilst also allowing for any want of alignment of the trunnions relatively to the jointing members, do not cure the error of alignment between the bearings or trunnions themselves situated at each end of the cylinder, and in consequence these latter are subject to excessive wear, the bore of the bearing tending to become enlarged at one or both ends. A further fault of these previously proposed arrangements is that the spherical faced parts require to be held with considerable pressure against the trunnion ends, which act as brakes on the cylinder.

In the said known arrangements in which the spherical faced joints are employed, the joints are arranged at points removed from the bearings, and on that side of the bearings furthest from the cylinder. In these circumstances any mal-alignment of the bearings or trunnions is of the greatest magnitude at the joints, thus increasing the tendency of the joints to be broken.

Another object of this invention is so to arrange the joints that any want of alignment of the bearings or trunnions will have practically little or no effect on the joints.

A further object is to combine with the improved bearings anti-friction balls or rollers whereby the wear of the revolving parts is reduced to a minimum, said balls or rollers being entirely enclosed and protected from dust, vapour, etc., and the grease used for lubricating the ball or rollers prevented reaching the cloth on the cylinders, said balls or rollers in one application being arranged so that with any angular movement of the trunnion within the bearing, no end thrust is put on the balls or rollers, or their race rings, but such angular movement is controlled by radial loads on the bearings, thereby prolonging the life of the anti-friction members indefinitely.

According to the invention, each cylinder trunnion is supported by bulbous or ball-like part, carried either by the doll head, or by a stationary annular member, surrounding the doll-head, said ball-like part when carried by the doll head being held stationary and when carried by the stationary annular member being free to swivel within limits, whilst also being free to slide bodily with any elongation or contraction of the cylinder. Within the said ball-like part and therefore at a radius less than that of the periphery of the ball-like part, is arranged the means for making the fluid-tight joint between the doll head and the cylinder trunnion, the said joint being in a plane passing through (or as near as possible to) the centre of the ball-like part.

Upon the trunnion is fixed a tubular member which extends in itself, or with suitable additions, over the end of the doll head, and beyond the ball-like part, which thereby serves to form the bearing proper of the cylinder trunnion.

With any mal-alignment of the doll heads, the ball-like part of each bearing allows the tubular member on the trunnion to take up an angular position relatively to the doll head corresponding to the degree of error of alignment and, in such position, be free to rotate without injury to the bearing, whilst by reason of the jointing means being arranged within the ball-like part, the effect of the mal-alignment of the doll heads on the joints is practically nil.

In applying anti-friction balls or rollers to said bearing, they are arranged between the said tubular member on the trunnion and the ball-like part, suitable means being provided to carry and position the race rings, and end covers (swivelling with the bearings) being provided to exclude dust, vapour, etc., and retain the grease used in lubricating the bearings.

The invention will be further described with the aid of the accompanying drawings, wherein:—

Fig. 1 and Fig. 1ª collectively illustrates a longitudinal sectional elevation of one example of the improved self-aligning bearings, Fig. 2 illustrates a modification of part of Figure 1, in section.

Fig. 3 illustrates a longitudinal sectional elevation of another example of the bearings, Fig. 4 being a cross section on line x—x. Fig. 3ª illustrates a horizontal section of a modification of Fig. 3.

Figs. 11 and 12 illustrate respectively a side view (partly sectional) and an end view of a further example of the invention.

Figure 1:
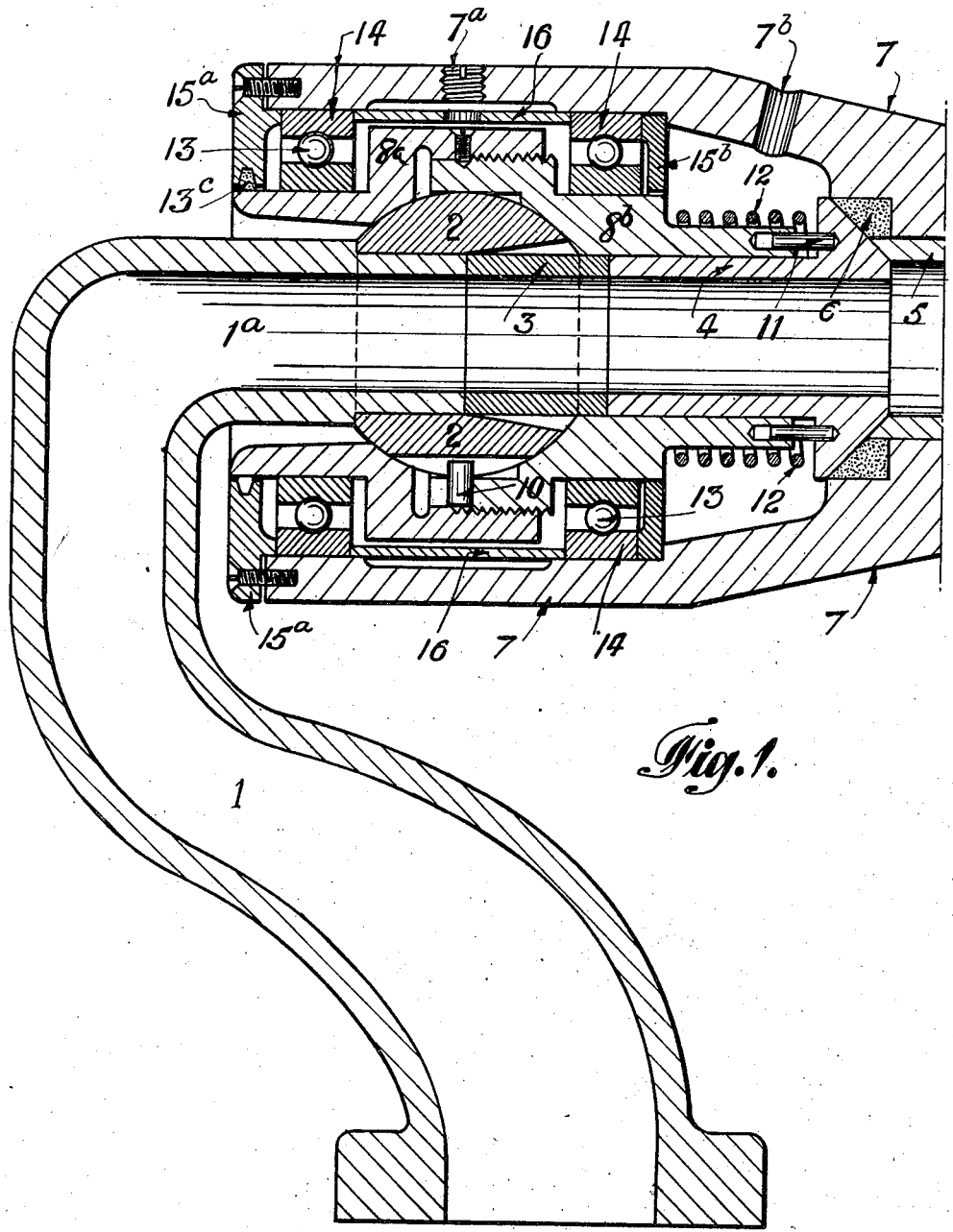
Figure 1A:
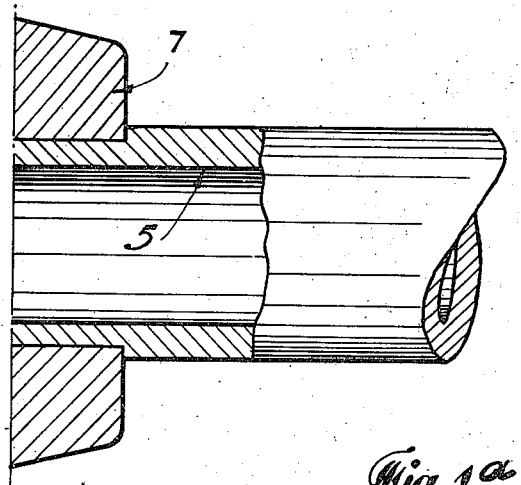
Figure 2:
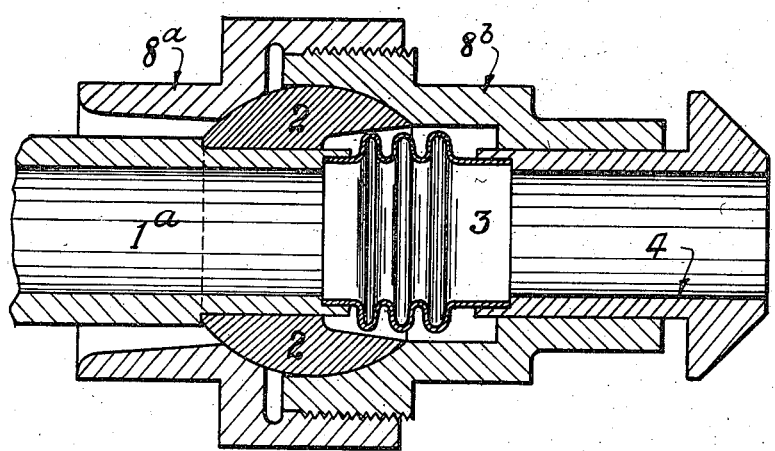

In carrying out the invention in one convenient manner and as illustrated in Figure 1, the doll head 1 is formed with a plain parallel-sided horizontal part 1ª on the end of which is secured, by welding or other suitable means, a metal ball 2. Such ball is provided with a through orifice, and when fixed to the doll head overhangs the same as shown, one end of said orifice being adapted to fit the doll head, whilst the other end is enlarged. To that part of the doll head within the said metal ball (and thereby protected) is secured one end of the jointing member 3, such as a short length of reinforced rubber tubing (see Figure 1) of flexible metallic tubing (see Figure 2) the other end of said member being secured to a metal tube 4, which forms part of a further joint between itself and the cylinder trunnion 5. Such further joint may be a conical or spherical face on the end of the metal tube 4 bearing against a conical or spherical seating on the trunnion 5, said seating, if desired, being faced with fibrous or metallic packing 6.

On the cylinder trunnion 5 is rigidly secured a tubular member 7, which forms an extension of the trunnion and which extends over the end of the doll head and lies around the metal ball 2. Between this latter and the said tubular member is a two-part sleeve shaped to fit the ball, the parts 8$^a$, 8$^b$ of the sleeve being connected together by one screwing or fitting into the other, and by one or more set screws 9 screwing through one or both of the overlapping parts. By means of one or more pins 10 carried by the two-part sleeve engaging a groove or grooves in the ball 2 parallel with the axis of the bearing, the said sleeve is prevented rotating whilst left free to swivel in the direction of the grooves, and around the pins, within the limit allowed by the clearance left between such sleeve and the doll head. The said metal tube 4 aforesaid, to which the jointing member 3 is secured, is provided with pins 11 or the like which slidably project into holes in the end of the said two-part sleeve, thereby causing said tube and sleeve to maintain alignment with each other, and prevent the tube rotating with the trunnion. A spring 12 (or the pressure of the fluid passing through the bearing) serves to yieldingly force the said metal tube against its seating. Instead of the end of the sliding tube being formed conical, or spherical to engage a like face on the trunnion, it may be plain and slide within the trunnion (or upon a projecting part of the trunnion) and the joint be made by means of packing. In either of the arrangements the pressure for maintaining the joint will be comparatively light and not such as to put any undue friction on the trunnion.

Between the said two-part sleeve and the trunnion extension 7 are arranged the anti-friction balls (or rollers) 13 and their race rings 14, there being preferably two sets of rings and balls (or rollers) and one set to the right and the other to the left of the centre of the ball 2 on the doll head. The outer race rings are secured to the said trunnion extension by means of two end flanges 15$^a$, 15$^b$ and a distance sleeve or ring 16, whilst the inner race rings are mounted (with a sliding fit) upon the two-part sleeve. With the anti-friction balls (or rollers) thus applied any angular or swivelling movement of the trunnion will not injure the balls (or rollers) or rings. Holes may be provided in parts 7 and 16, to admit lubricant to the ball bearings, the hole in the part 7 being normally closed by a plug 7$^a$. A further hole 7$^b$ may be provided for lubricating parts 4 and 8$^b$.

From the foregoing it will be seen that by mounting the cylinder upon the ball-like parts 2 of the doll heads, the latter will allow of any want of alignment in the doll heads or trunnions, the cylinder rotating about an axis corresponding to a straight line drawn from the centre of the ball-like part of one doll head to the centre of the ball-like part of the other doll head, or the trunnions 5 oscillating continuously about the ball-like parts to an extent corresponding to the degree of mal-alignment. It will also be seen that the weight or load of the cylinder comes on the ball-like parts carried by the doll heads and not on the jointing members 3. Further, by arranging the jointing members 3 within the ball-like parts any mal-alignment between the doll heads, or trunnions, does not injuriously affect the joints, the degree of deflection (if any) being negligible.

In carrying out the invention according to another example and as illustrated in Figures 3 and 4, the jointing member is arranged on the end of the part 1$^a$ of the doll head, and is preferably in the form of an elastic or flexible packing ring 17. Such jointing member bears against the inner face of a tubular part 18 carried by a tightly fitting tubular extension 19 of the cylinder trunnion 5, and the arrangement is such that the packing ring 17 has to maintain the joint against the rotary, angular and longitudinal movements of the trunnion and said tubular extension. The anti-friction balls (or rollers) are arranged outside the tubular extension 18 and the outer race rings 19$^a$ are carried by a cylindrical member 20, the outer periphery of which is shaped to form part of a sphere. Encircling such member 20 is a stationary ring or housing 21 carried from the doll head, the spherical face of the cylindrical member 20 contacting with the inner face of the stationary ring or housing 21. By means of a stud 21$^a$ in the housing and groove in the member 20, the latter while free to swivel is prevented rotating.

The curvature of the spherically shaped member 20 is struck from a centre which lies in a plane coincident with or near to that in which the jointing member 17 lies, and therefore, any mal-alignment of the trunnions or doll heads will not injuriously affect the joint.

As shown in Figure 3$^a$, the jointing member may be made in two parts 17$^a$, 17$^b$, the part 17$^a$ being made say of fibre and the part 17$^b$ being made of metal, and to allow of the elongation and contraction of the cylinder, the packing may be adapted to slide along part 1$^a$ of the doll head, suitable keys and keyways 17$^c$ being provided to prevent rotation.

To facilitate the assembling or adjustment of the parts and to allow of the packing being renewed or examined without disturbing the doll head as a whole, that part 1$^a$ of the doll head carrying the jointing member is made separate from the other part of the doll head, this latter being formed with a head part or boss 1$^b$ bored to receive the part 1$^a$ which extends through the said head part or boss and is secured against rotation and in position by a screwed ring 1ᶜ. In that portion of the part 1ᵃ lying within the boss 1ᵇ are openings for the passage of steam or water to or from the cylinder.

Figure 5:
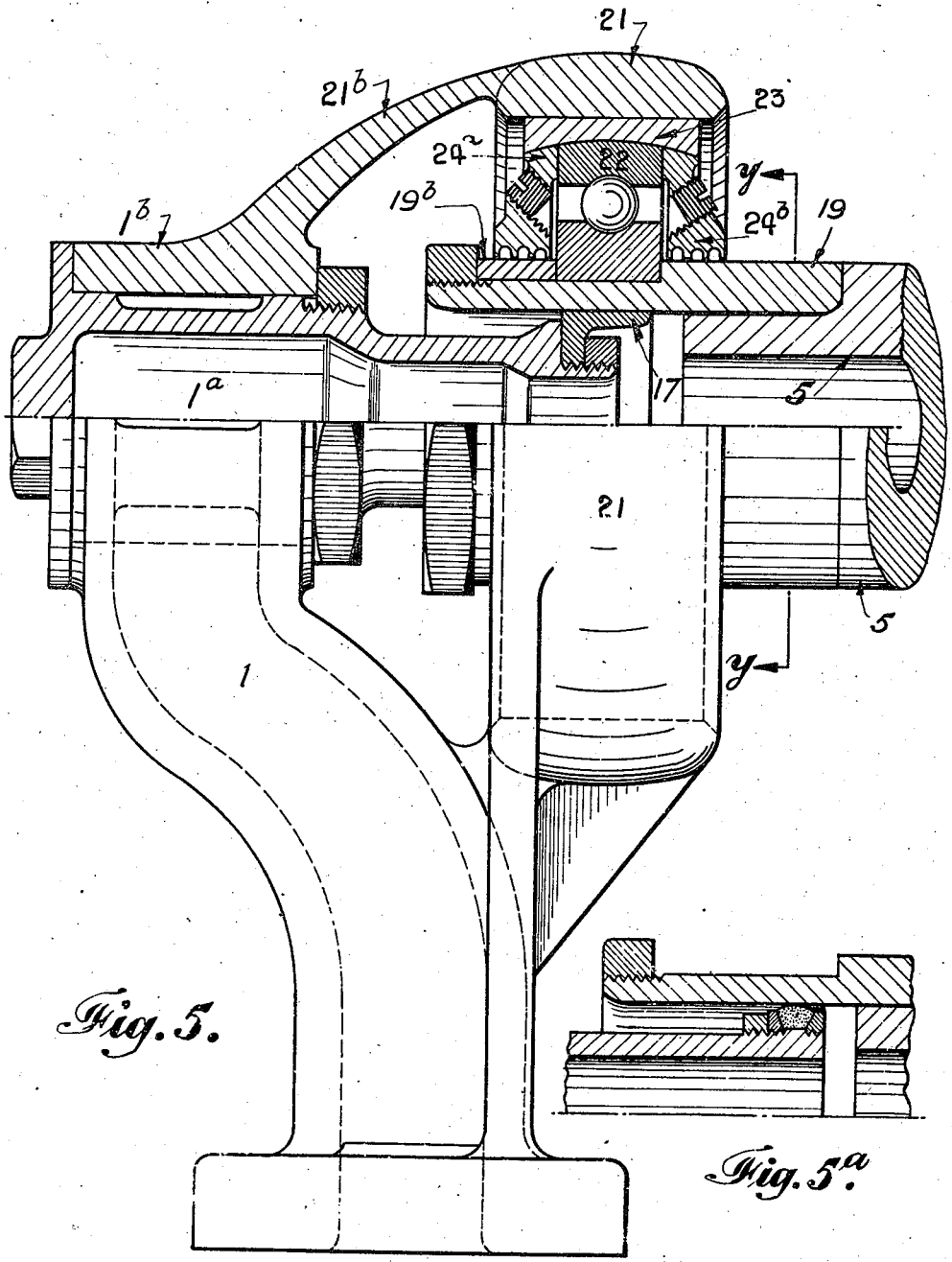
Figs. 5 and 6 illustrates similar views of a further example of the improved bearings, Fig. 5ª illustrates a modified detail.
Figure 6:
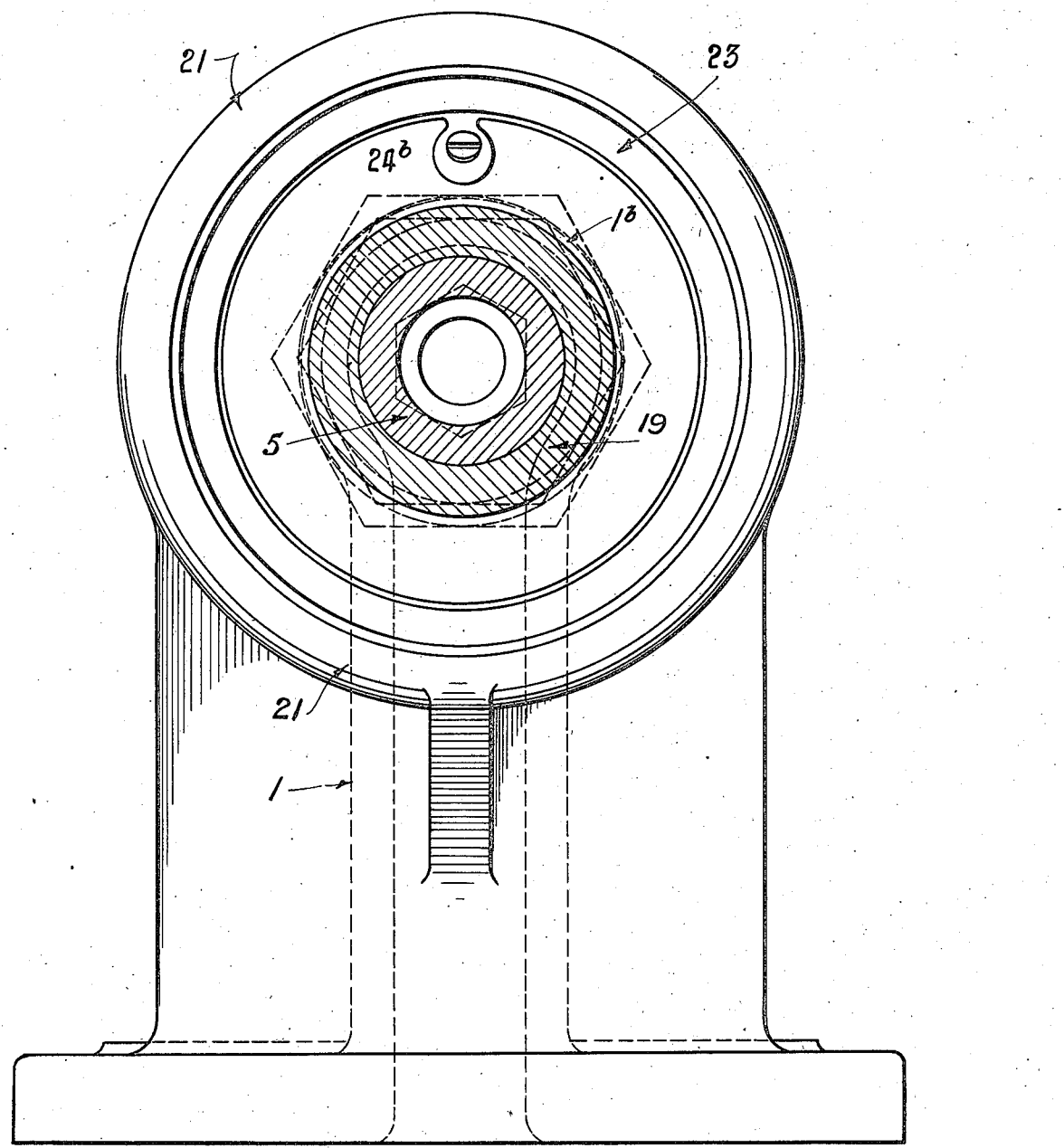

Although preferring to employ two sets of anti-friction balls or rollers, one set only may be used preferably arranged in the plane of the swivel centre. Figures 5 and 6 show one example of this arrangement. The outer race ring 22 is formed spherical on its periphery, and contacts with a like inner face of the ring 23, this latter being cylindrical outwardly, and slidably and rotatably fitting the stationary ring 21. Also fitting the ring 22 are end flanges 24ᵃ, 24ᵇ, which are free to swivel with the outer race ring within the ring 23. Said end flanges lie close to the part 19 and a sleeve 19ᵇ on such part, so that whilst the anti-friction balls carry the principal running load, the flanges 24ᵃ, 24ᵇ form plain bearings for the swivelling motion and at the same time act as protecting end covers for the balls (or rollers) and rings. This arrangement of rings 22, 23 balls and flanges, is an adaptation of the known self-aligning ball bearings to the purpose of this invention.

The flanges 15ᵃ, 15ᵇ in Figure 1, the flanges 20ᵃ, 20ᵇ in Figure 3, and the flanges 24ᵃ, 24ᵇ in Figure 5, form end covers which serve to exclude dust, vapour, etc., from the anti-friction bearings and thereby considerably prolong the life of the bearings. Said end covers also serve to retain the oil or grease used to lubricate the bearings, their inner edges being formed with annular grooves as in Figures 1 and 3 to receive felt or like packing rings 15ᶜ, or being merely grooved as shown in Figure 5. With the parts carrying the inner and outer race rings always parallel, the end flanges or covers always maintain the same relative positions, whatever may be the mal-alignment of the doll heads or trunnions and thereby enable them to always effectively protect the anti-friction bearings from dirt, vapour, etc.

Figure 10:
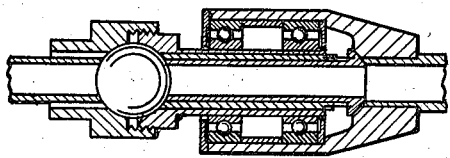
Fig. 10 illustrates a longitudinal section of a further modification.

Whilst describing the sets of anti-friction balls or rollers as being arranged to right and left respectively of the ball-like or spherical part of each doll head, both sets may be arranged to one side of the said part, and preferably on the cylinder side, one such arrangement being shown in diagram in Figure 10.

In lieu of the packing shown in Figure 5, a gland type of packing may be used, as shown in Figure 5ᵃ.

Figure 7:
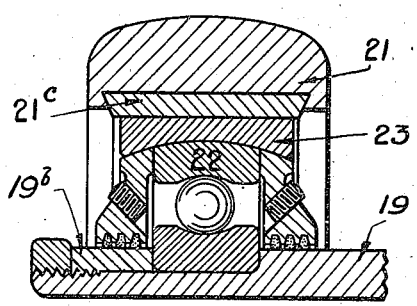
Figs. 7, 8 and 9 illustrate cross sectional views of modified details.
Figure 8:
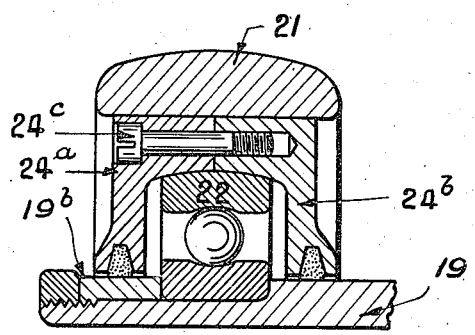
Figure 9:
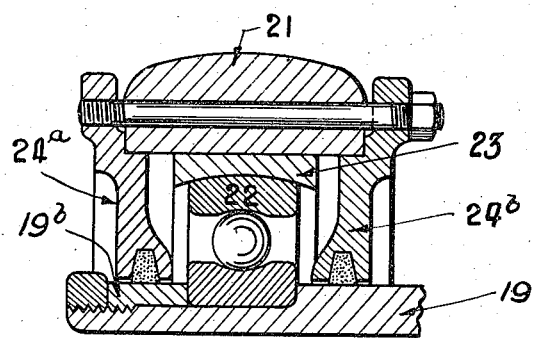

As shown in Figure 7, a white metal or like anti-friction liner 21ᶜ may be provided between the housing 21 and the ring 23; or the ring 23 itself may be made of white metal or the like. And as shown in Figure 8, the ring 23 may be dispensed with, and the end flanges or end covers 24ᵃ, 24ᵇ may be formed to also serve as the ring, set studs 24ᶜ being provided to hold the parts together. Instead of the flanges or end covers being fitted to the ring 23, they may be fitted and bolted to the housing 21 as shown in Figure 9.

As shown in Figures 11 and 12, a ring 25 is employed said ring being pivoted by a pin 26 to the lower part of the doll head. The outer face of the outer race ring 22 and of the end flanges 24ᵃ, 24ᵇ and the inner face of the ring 25 are correspondingly curved and thereby provide the necessary swivel support for the trunnion. One of the rings 25 is held against angular movement by a set screw 27, the point of which enters a hole in the doll head. The ring at the opposite end of the cylinder is left free to allow for the endwise elongation or contraction of the cylinder. Instead of being pivoted to the lower part of the doll head, the ring 25 may be suspended from a pivot carried by an overhanging extension of the doll head.

The packing ring 28 may be made to two diameters see Figure 11, and one end tightly fit within an annular recess in the part 1ᵃ, the pressure of the steam or other fluid passing to the cylinder helping to hold the packing ring in position. The packing may be bevelled at the end within the recess to ensure of a close joint, and dowel pins 29 may be used to prevent rotation of the packing ring relatively to the part 1ᵃ.

The improved self-aligning bearings may be adapted to be used as plain bearings, i. e.; without the anti-friction balls or rollers, the essential feature of the invention being the free-swivelling bearings mounted in such a manner as to eliminate the load due to mal-alignment strains, and so arranged as to give protection to the conduit joints.

What I claim is:—

1. In combination, a stationary doll-head conduit, a hollow cylinder trunnion, a ball-like or spherical member between the conduit and the trunnion by which the trunnion is axially supported about the conduit and by which the trunnion is free to swivel and move endwise and means within the ball-like or spherical member whereby a fluid tight joint is provided between the conduit and the trunnion, the said ball-like or spherical member taking no part of the jointing functions of the bearing, whilst the jointing means are unaffected by the swivelling action of the trunnion, as set forth.

2. In combination, a stationary doll-head conduit, a hollow cylinder trunnion, a tubular member coaxial with the trunnion, a flexible packing ring coacting with the conduit and tubular member to make a conduit joint and a ball-like or universal bearing for the trunnion outside and surrounding the said conduit joint, and coacting with the conduit to support the trunnion axially and allow of universal axial and endwise movements of the trunnion, without adversely affecting the conduit joint, as set forth.

3. In combination, a stationary doll-head conduit, a hollow cylinder trunnion to which the conduit is adapted to be connected while allowing of the rotating and endwise movements and mal-alignment of the cylinder trunnion, a flexible packing ring, and a tubular member between said conduit and trunnion, a spherically shaped annular member surrounding the packing ring and adapted to coact with the doll-head conduit and the tubular member to support the trunnion axially and also to allow universal axial movements, the said members also allowing of endwise movement of the cylinder trunnion towards and away from the doll-head conduit, and the free rotation of the trunnion, as set forth.

4. In combination, a stationary doll-head conduit, a hollow cylinder trunnion, a tubular member forming an extension of the trunnion, an annular member loosely mounted on said tubular member but incapable of moving endwise independently of the tubular member, the periphery of the annular member being part of a sphere, a ring or housing supported by the doll-head, and with which the said spherical annular member coacts to axially support the trunnion, and a flexible packing ring carried by the doll-head conduit and lying within and making contact with the said tubular member, and also lying within the radius of the spherical contour of the annular ring, space being left between the doll-head conduit and the tubular member to allow of the clearance necessary for any mal-alignment of the trunnion, as set forth.

5. In combination, a stationary doll-head conduit, a hollow cylinder trunnion, a tubular member forming an extension of the trunnion, an annular member exterior to and concentric with said tubular member, having a periphery which forms part of a sphere, anti-friction devices between said annular member and the tubular member, and means whereby the annular member and anti-friction devices are incapable of moving endwise independently of the tubular member, a ring or housing supported by the doll-head, within which the annular member may slide and by which it serves to axially support the trunnion and also allow of universal axial movements and endwise movements of the trunnion, a flexible packing ring carried by the doll-head conduit and lying within and making contact with the said tubular member, and also lying within the radius of the annular ring, space being left between the doll-head conduit and the tubular member to allow of the clearance necessary for any mal-alignment of the trunnion, as set forth.

6. In combination, a stationary doll-head conduit, a ring or housing supported by said conduit, a hollow cylinder trunnion, a tubular extension fixed to said trunnion and overhanging the end of same, a packing ring carried by the doll-head conduit, and lying within and contacting with the said tubular extension of the trunnion, an annular member surrounding said tubular member, and having a periphery corresponding to part of a sphere, and coacting with the said ring or housing to support the trunnion axially and allow of universal axial movement and endwise movement of said trunnion, as set forth.

7. In combination, a stationary doll-head conduit, a ring or housing supported by said conduit, a hollow cylinder trunnion, a tubular extension fixed to said trunnion and overhanging the end of same, a packing ring carried by the doll-head conduit, and lying within and contacting with the said tubular extension of the trunnion, an annular member surrounding said tubular member and having a periphery corresponding to part of a sphere, and coacting with the said ring or housing to support the trunnion axially and allow of universal axial movement and endwise movement of said trunnion, anti-friction devices being provided between said tubular extension of the trunnion and the annular member to reduce friction and said annular ring having end flanges which enclose the anti-friction devices, as set forth.

In testimony whereof I have signed my name to this specification.

GERALD DOD.